(12) United States Patent
Gauthier, Jr. et al.

(10) Patent No.: US 10,110,605 B2
(45) Date of Patent: *Oct. 23, 2018

(54) TARGETED USER ACCESS CONTROL SYSTEM

(71) Applicant: The Travelers Indemnity Company, Hartford, CT (US)

(72) Inventors: James J. Gauthier, Jr., Avon, CT (US); Mathew S. Bryant, Portland, CT (US); Richard J. Heffernan, Hebron, CT (US); Leonard A. Mariani, Mont Clair, NJ (US); Jonathan B. Musoke, Farmington, CT (US); Jeffrey F. Carlson, Ivoryton, CT (US); David Klatte, Acton, MA (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/691,832

(22) Filed: Aug. 31, 2017

(65) Prior Publication Data
US 2017/0366550 A1    Dec. 21, 2017

Related U.S. Application Data

(63) Continuation of application No. 14/951,910, filed on Nov. 25, 2015, now Pat. No. 9,756,051.
(Continued)

(51) Int. Cl.
*H04L 29/06*    (2006.01)
*H04L 12/26*    (2006.01)
(Continued)

(52) U.S. Cl.
CPC .............. *H04L 63/10* (2013.01); *H04L 43/08* (2013.01); *G06Q 30/02* (2013.01); *H04L 67/02* (2013.01)

(58) Field of Classification Search
CPC ......... H04L 63/10; H04L 67/02; H04L 43/08; G06Q 30/02
(Continued)

(56) References Cited

U.S. PATENT DOCUMENTS 7,054,830 B1    5/2006 Eggleston et al.
7,079,546 B2    7/2006 Krishnan
(Continued)

OTHER PUBLICATIONS

International Application No. PCT/US2015/062582 International Search Report and Written Opinion dated Apr. 1, 2016 (TCL0011 PCT), 13 pages.

*Primary Examiner* — Baotran N To
(74) *Attorney, Agent, or Firm* — Cantor Colburn LLP

(57) ABSTRACT

A system includes a network interface, at least one processing device, and at least one memory device. The at least one memory device stores instructions that when executed result in initiating creation of a single-use targeted link that provides access to a restricted access data entry system and serves the single-use targeted link through the network interface to a computer system of a targeted user with a time validity constraint. An access request received at the restricted access data entry system through the single-use targeted link is verified as being received within the time validity constraint. A network traffic throttling control reduces network traffic volume received through the single-use targeted link based on determining that the network traffic volume exceeds a traffic volume threshold. An identity control at the restricted access data entry system is applied to confirm entry of at least one identifying characteristic that matches the targeted user.

19 Claims, 14 Drawing Sheets

Related U.S. Application Data

(60) Provisional application No. 62/084,663, filed on Nov. 26, 2014.

(51) Int. Cl.
*H04L 29/08* (2006.01)
*G06Q 30/02* (2012.01)

(58) Field of Classification Search
USPC .......................................................... 726/7
See application file for complete search history.

(56) References Cited

U.S. PATENT DOCUMENTS

| | | |
|---|---|---|
| 7,644,434 B2 | 1/2010 | Pollutro et al. |
| 8,321,565 B2 | 11/2012 | Bao et al. |
| 9,756,051 B2 * | 9/2017 | Gauthier, Jr. ........... H04L 63/10 |
| 2005/0243862 A1 | 11/2005 | Krishnan |
| 2012/0143671 A1 | 6/2012 | Hansen et al. |
| 2014/0279614 A1 | 9/2014 | Lonstein et al. |
| 2016/0149919 A1 | 5/2016 | Gauthier et al. |

\* cited by examiner

Get a Gift Card in a few simple steps.*

402

① Register for offer code
② Confirm your identity
③ Complete your Quote

---

Register for your offer code
Please fill out form below to begin your offer registration.
Enter address your offer will be mailed to.

First Name
Last Name
Suffix [Name ▼]

Date Of Birth
Example: 01/31/1990
Email

Street Address
Apt/Suite # (Optional)

City
State [Select ▼]
Zip Code

Telephone Number
Enter your 10 digit phone number

Do you currently have Auto insurance? [Select ▼]
Are you currently a customer? [Select ▼]

Do you own your home/condo? [Select ▼]
How is your credit? [Select ▼]

Do you currently have a valid US License?
○ Yes   ○ No

*wfhReLW5*
Enter the text above:

[ Submit ＞ ]

FIG. 4

Get a Gift Card in a few simple steps.*

402

1. Register for offer code
2. Confirm your identity
3. Complete your Quote

600

Confirm Your Identity

Please confirm your identity by completing the quiz below in under 2 minutes.

Refreshing your browser will result in a failure of the quiz.

Which of the following is/was your PHONE NUMBER?
- ○ 123-4567
- ○ 321-9875
- ○ 321-9875

Which of the following STREETS have you PREVIOUSLY or CURRENTLY used as your address?
- ○ 123 Main Street
- ○ 456 Elm Street
- ○ 987 Oak Street In which year did you graduate high school?
- ○ 1957
- ○ 1958
- ○ 1959

Submit >

FIG. 7

TARGETED USER ACCESS CONTROL SYSTEM

CROSS REFERENCE TO RELATED APPLICATIONS

This application is a continuation of U.S. patent application Ser. No. 14/951,910 filed Nov. 25, 2015 and claims priority to U.S. Provisional Patent Application No. 62/084,663 filed Nov. 26, 2014, the entire contents of which are specifically incorporated by reference herein.

BACKGROUND

When directing content targeting a specific user or class of users through the Internet, a number of Internet-centric challenges can arise. For example, an entity may desire to present a particular user or class of users with an offer or incentive that would appeal to a larger general class of users. Even if the entity directly or indirectly presents the offer to a targeted user, the targeted user may share the offer to non-targeted users through social media, e-mail forwarding, offer code sharing web sites and the like. Sharing of a uniform resource locator (URL) associated with the offer to a number of other users can dramatically increase web traffic for the entity beyond an expected level of web traffic associated with targeted users. Further, if the entity provides access to targeted users through the Internet, the URL of a web site intended to interact with targeted users may be discovered and targeted by scripted attacks. Potential types of attacks can range from relatively simple single-machine attacks using a fixed Internet Protocol (IP) address to sophisticated, distributed attacks using collections of spoofed IP addresses. These Internet-centric problems are necessarily rooted in computer technology and specifically arise in the realm of computer networks. Thus, solutions to such Internet-centric problems are necessarily rooted in computer technology.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 4 depicts a user input interface according to some embodiments of the present invention;

FIG. 7 depicts an identity control at a user input interface according to some embodiments of the present invention;

DETAILED DESCRIPTION

According to an embodiment, a system for targeted user access control is provided. The system may be used for security and network traffic management in a computer network system to filter access attempts by users that were not targeted, to throttle network traffic, and to deflect scripted attacks through an ordered combination of features that solve multiple Internet-centric problems that are necessarily rooted in computer technology and specifically arise in the realm of computer networks. Embodiments may further manage offer-eligibility and fulfillment across a plurality of media channels. Through the use of single-use targeted links that are time validity constrained, the risk of non-targeted users attempting to access an offer across social media and couponing sites may be reduced. Fraudulent and unwanted traffic from online sources may be prevented using security features embedded in online offers and within the system itself.

Figure 1:
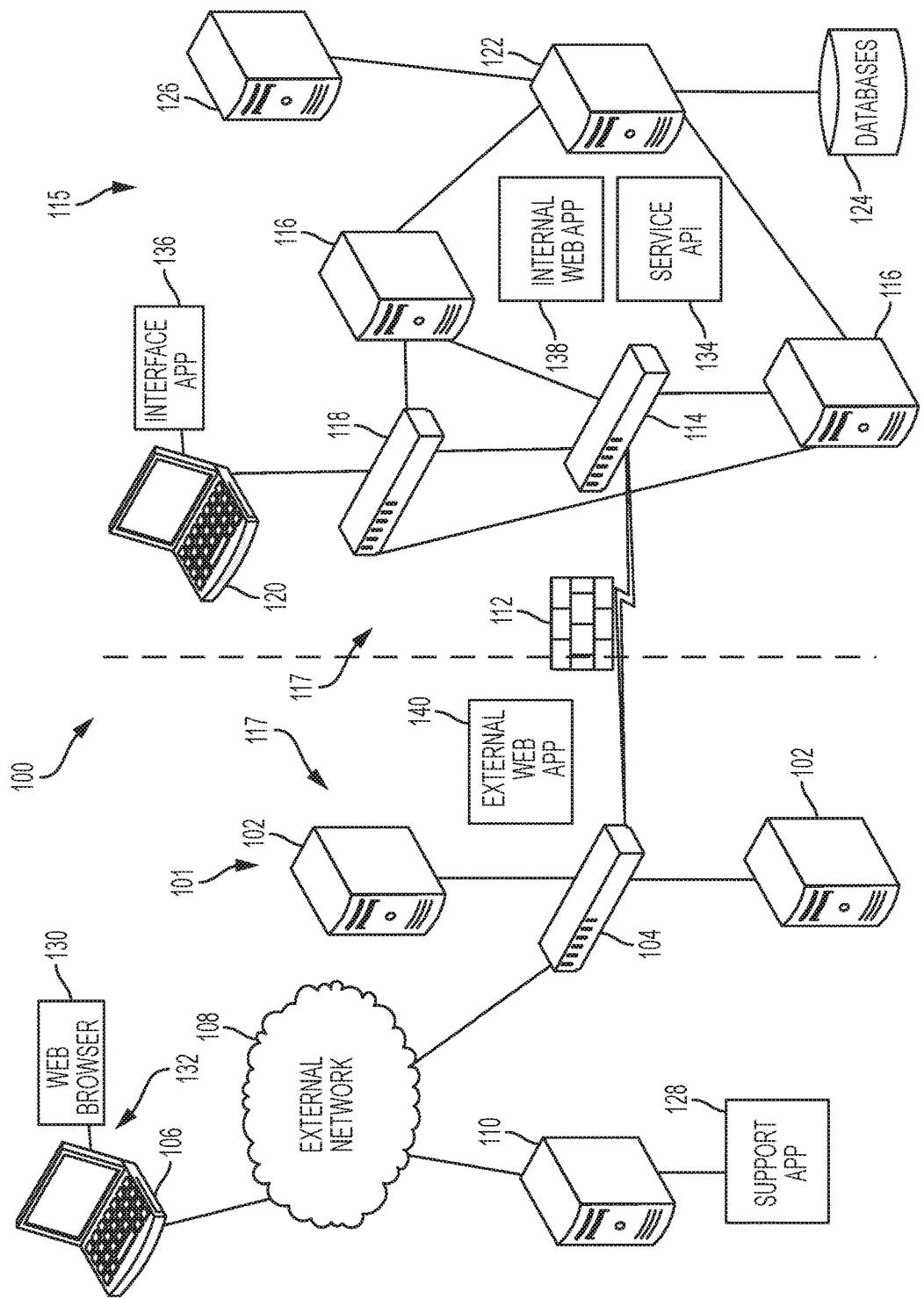
FIG. 1 depicts a block diagram of a system according to some embodiments of the present invention.

Turning now to FIG. 1, a system 100 is depicted upon which targeted user access control may be implemented. The system 100 includes a web zone 101, which may include two or more external web servers 102 coupled to an external web load balancer 104, where the external web load balancer 104 is an example of a network interface of the system 100. A plurality of user systems 106 can access content served by the external web servers 102 through an external network 108, such as the Internet, via the external web load balancer 104. The external network 108 can also link to one or more third-party support systems 110, such as an offer vendor, a risk advisor, a fulfillment vendor, a data broker, an identity validation service, and the like. The external web load balancer 104 is also coupled through a firewall 112 to a service application programming interface (API) load balancer 114 in a secure zone 115 of system 100. The service API load balancer 114 can balance loading between two or more internal web/application servers 116 in the secure zone 115 and may interface with an internal web load balancer 118 of the secure zone 115. The internal web load balancer 118 can interface with the two or more internal web/application servers 116 and internal user systems 120.

In the example of FIG. 1, the internal web/application servers 116 may each interface with a database server 122 to access one or more databases 124. The one or more databases 124 may include data related to offers/incentives, prospective users to target, security support data, user relationship data, various caches, and the like. Data in the one or more databases 124 may be organized in one or more tables of records that may be accessible by various applications in the secure zone 115, depending upon specific permissions. Select data from the one or more databases 124 can also be accessed by other systems, such as one or more of the third-party support systems 110. The database server 122 may also interface with a batch server 126 that can coordinate populating batches of prospective users to target from various data sources and may interface with direct mail processing systems, fulfillment vendors, and the like.

According to an embodiment, data regarding prospective users to target can be sent from system 100 to one of the third-party support systems 110, such as an offer vendor that uses a support application 128 to feed an offer to a web page that is viewable by a web browser 130 of one of the user systems 106 identified as a targeted user 132. The system 100 may identify the targeted user 132 based on comparing one or more lists of prospective users with selection criteria, such as geographic location, current customer status (e.g., current or past customer of the entity desiring to engage with the prospective users), offer redemption history, offer presentation history, age, and other such criteria. A service API 134 executable by the internal web/application servers 116 can track the generation of various identifiers, such as a prospect identifier, a machine identifier, an offer identifier, and the like with the one or more databases 124 to track offer status and time information with respect to a plurality of prospective users, such as targeted user 132. Internal users may use an interface application 136 on internal user systems 120 to interface with the service API 134 via an internal web application 138 to configure and monitor aspects of the system 100, such as establishing criteria for prospective user selection, checking offer status, monitoring network traffic, and interacting with prospective users who successfully complete a registration process.

Each targeted user 132 is provided with a single-use URL associated with an offer that links to an external web application 140 which executes on the external web servers 102. The external web application 140 runs and/or initiates a series of checks against the URL to determine if the URL is applicable for registration. All expired or previously used, or ineligible incentive URL's are knocked out with an error message. All valid URLs can continue to a web registration form for data entry as subsequently described in greater detail herein.

In the example of FIG. 1, each of the external web servers 102, user systems 106, third-party support systems 110, internal web/application servers 116, internal user systems 120, database server 122, and batch server 126 can include a processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100, such as elements of the web zone 101 (i.e., external web servers 102) and/or elements of the secure zone 115 (i.e., internal web/application servers 116, database server 122, and batch server 126). Together, the web zone 101 and the secure zone 115 may be referred to as a restricted access data entry system 117.

Although depicted separately, one or more of the external web servers 102, user systems 106, third-party support systems 110, internal web/application servers 116, internal user systems 120, database server 122, and batch server 126 can be combined or further subdivided. In an embodiment, the web zone 101 and the secure zone 115 of system 100 are implemented by an insurance company to incentivize completing a quote for one or more insurance products by targeted individuals or households.

The user systems 106 and internal user systems 120 may each be implemented using a computer executing one or more computer programs for carrying out processes described herein. In one embodiment, the user systems 106 and internal user systems 120 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 106 are operated by prospective users, and the internal user systems 120 are operated by employees or contractors of an entity seeking to engage with prospective users. It will be understood that while only single instances of the user systems 106 and internal user systems 120 are shown in FIG. 1, there may be multiple user systems 106 and internal user systems 120 in embodiments.

Each of the external web servers 102, user systems 106, third-party support systems 110, internal web/application servers 116, internal user systems 120, database server 122, and batch server 126 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

Figure 2:
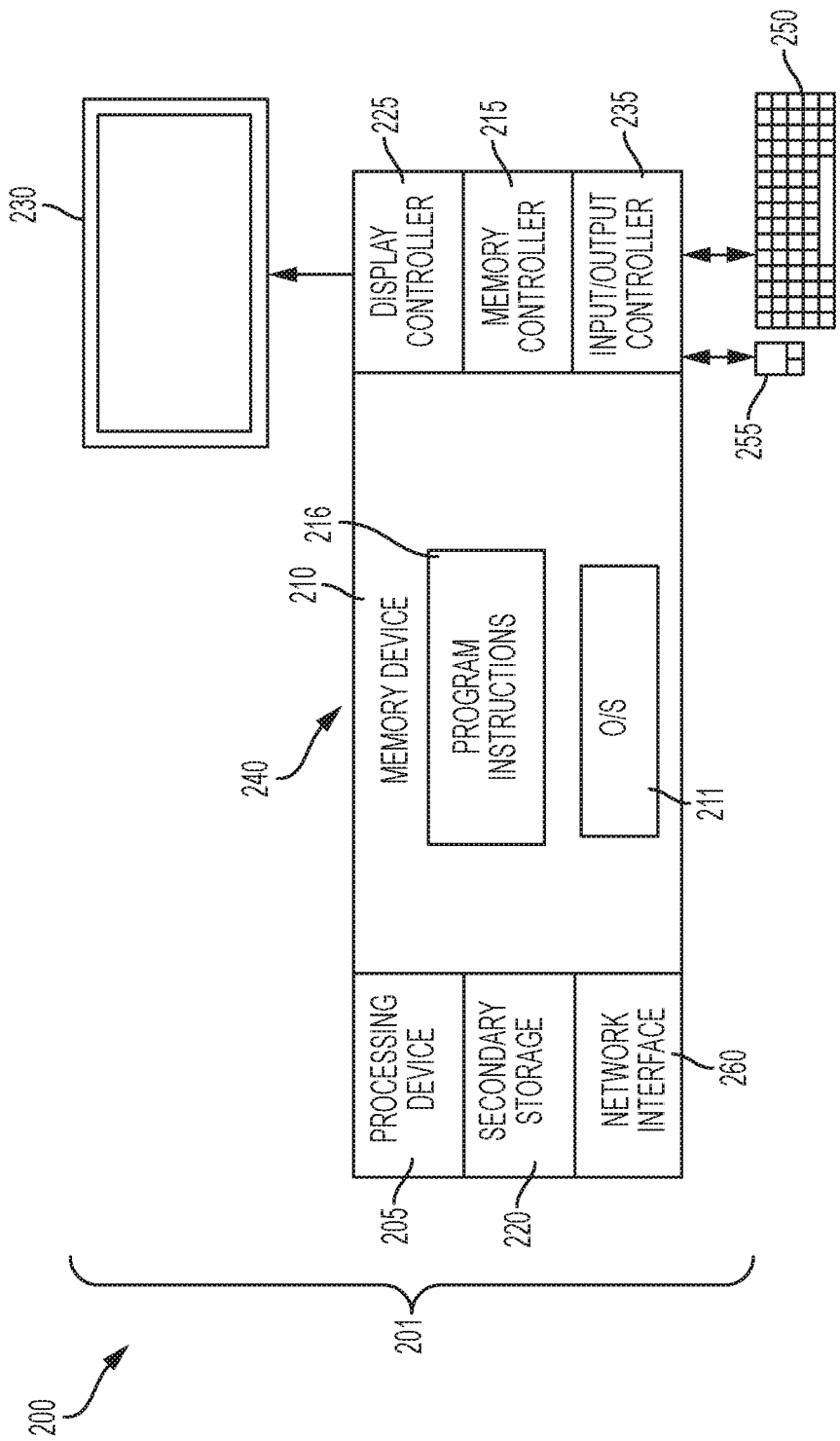
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the user systems 106 or internal user systems 120 of FIG. 1. The external web servers 102, third-party support systems 110, internal web/application servers 116, database server 122, and batch server 126 of FIG. 1 can also include similar computer elements as depicted in the computer 201 of FIG. 2.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remote from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the support application 128, web browser 130, service API 134, interface application 136, internal web application 138 and/or external web application 140 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in one of the user systems 106 of FIG. 1, the network interface 260 can establish communication channels with at least one of the external web servers 102 of FIG. 1 via external web load balancer 104 and external network 108.

Figure 3:
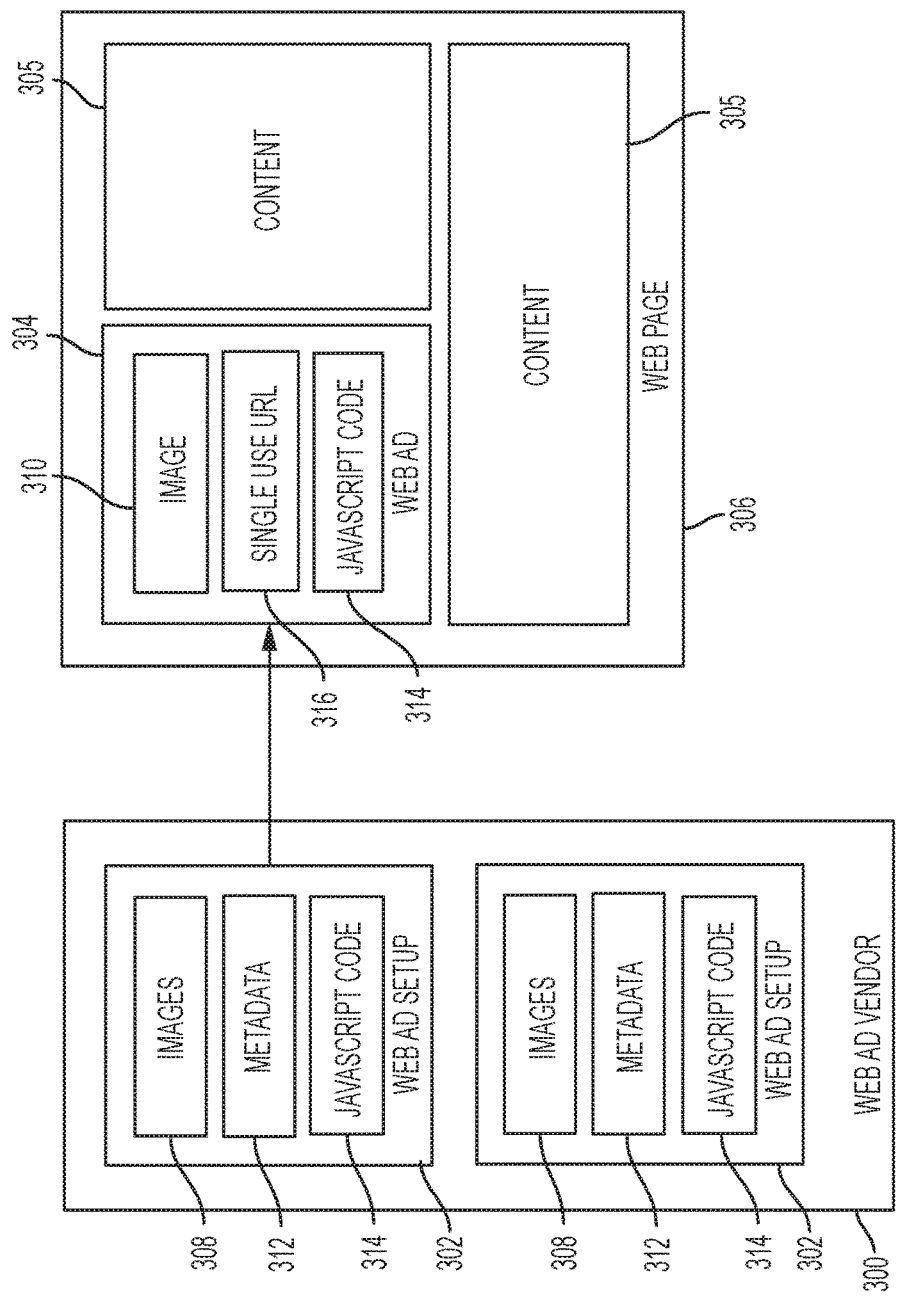
FIG. 3 depicts web page creation with a single-use URL according to some embodiments of the present invention.

FIG. 3 depicts an example of web page creation with a single-use URL according to an embodiment. A web advertisement (i.e., "web ad") vendor 300 is an example of one of the third-party support systems 110 of FIG. 1. The web ad vendor 300 may be supplied with a plurality of web ad setups 302 from system 100 of FIG. 1. For instance, the service API 134 of FIG. 1 may create the web ad setups 302 based on data stored in the one or more databases 124 of FIG. 1 and provide the web ad setups 302 along with data identifying prospective users to the web ad vendor 300. The web ad vendor 300 can select when to supply a specific web ad setup 302 for inclusion as a web ad 304 viewable in addition to content 305 on a web page 306 by the targeted user 132 using web browser 130 of FIG. 1. As used herein an "ad" may comprise an advertisement, offer at checkout, or the like seeking to encourage the targeted user 132 to click through and engage in further interactions. In the example of FIG. 3, each web ad setup 302 includes images 308 from which an image 310 can be selected to display in the web ad 304, metadata 312, and code 314, such as JavaScript. The metadata 312 can provide data used to create a single-use URL 316 in the web ad 304. The single-use URL 316 may include a base URL, a generated user identifier, a timestamp, a checksum, and an incentive identifier appended together and hashed. Hashing of data values can be performed by mapping data of an arbitrary size to a fixed size, for example, using a hash table or function that encodes the data in a compact form. The single-use URL 316 can be created when the code 314 sent in the web ad 304 executes. Data in the single-use URL 316 are returned to one of the external web servers 102 of FIG. 1 targeted by the base URL upon a user, such as targeted user 132 of FIG. 1, clicking the single-use URL 316. The external web servers 102 of FIG. 1 can perform checks against the data associated with the single-use URL 316 using the service API 134 of FIG. 1, for example. Upon confirming that the single-use URL 316 is eligible for registration, the external web servers 102 of FIG. 1 may provide the targeted user 132 of FIG. 1 with access to a registration form 400 as depicted in FIG. 4.

Figure 5:
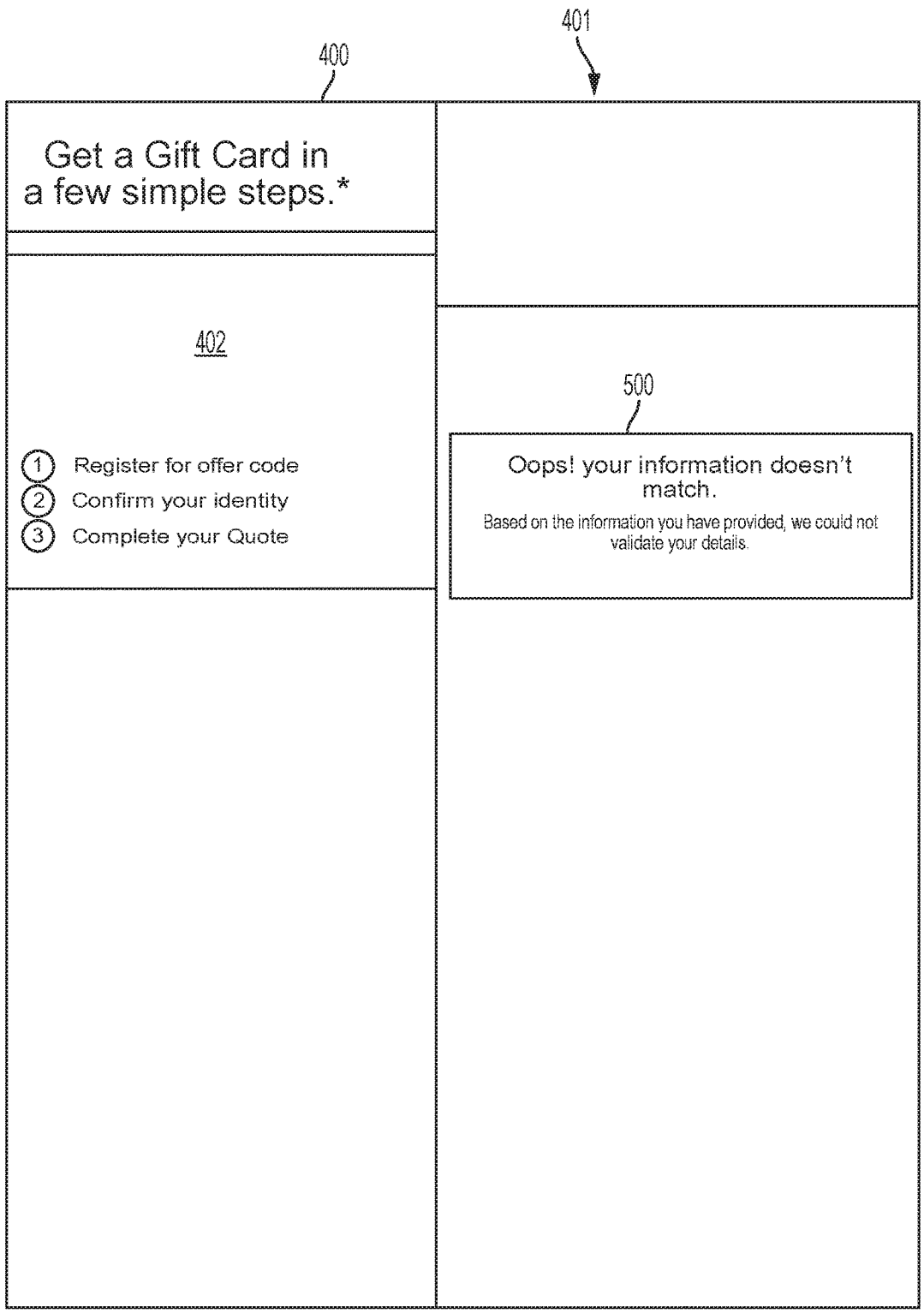
FIG. 5 depicts a knockout message due to an authentication failure at a user input interface according to some embodiments of the present invention.
Figure 6:
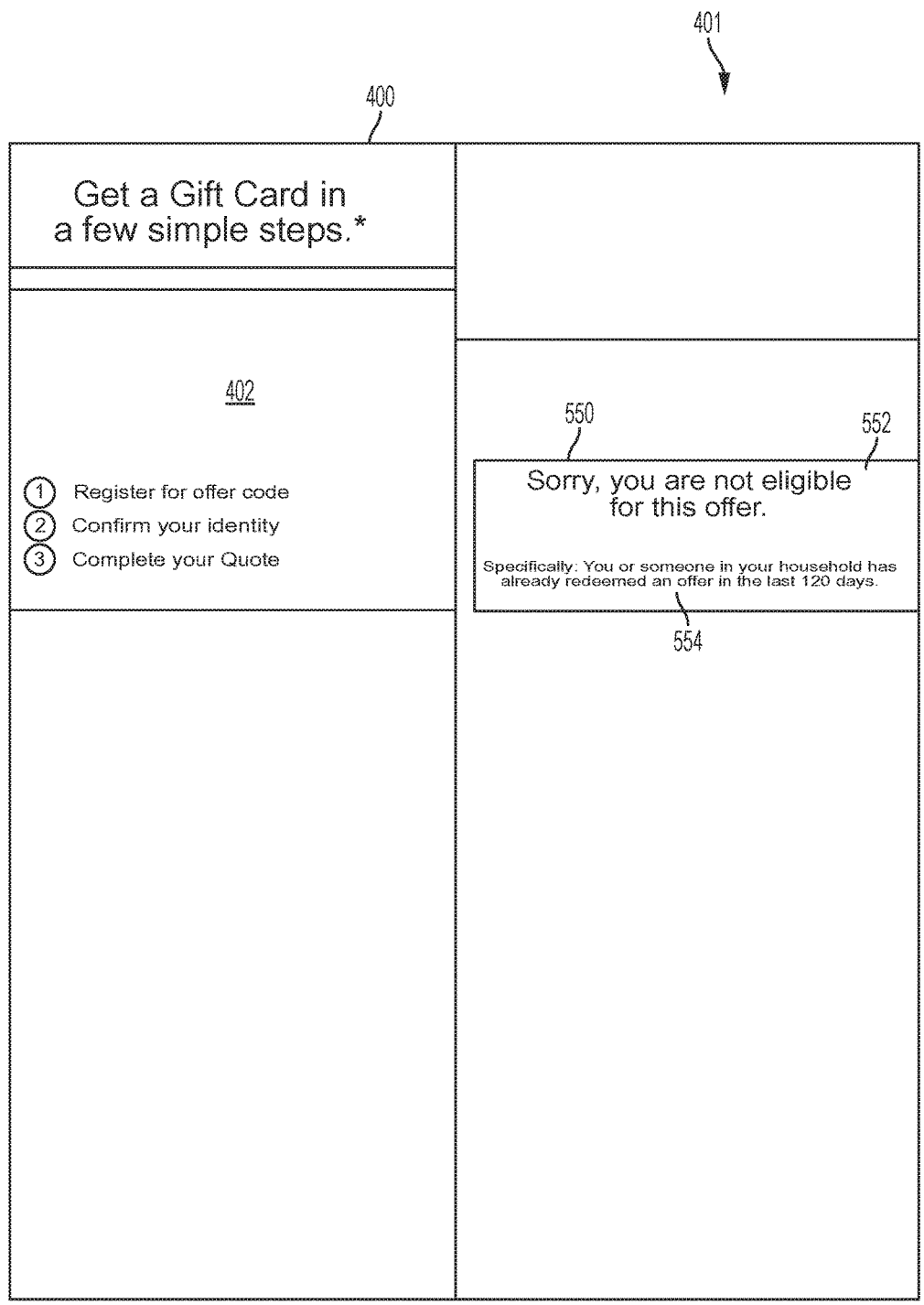
FIG. 6 depicts a knockout message due to a time-based household redemption rule violation according to some embodiments of the present invention.

FIG. 4 depicts a user input interface 401 of registration form 400 according an embodiment. The registration form 400 may include instructions 402 and a data collection portion 404 of the user input interface 401 enabling the targeted user 132 of FIG. 1 to input data to determine whether eligibility criteria are met before advancing. A bot prevention interface 406 may provide a real-time bot prevention code to prevent an offer bot from advancing in the offer registration process. Bots may be implemented as software applications that run automated tasks over the Internet to fetch and analyze information and/or attempt to gain access to web servers and associated resources. The bot prevention interface 406 may comprise a CAPTCHA/reCAPTCHA form. A submission button 408 can be selected when all data entry is complete on the user input interface 401. If there is a failure to correctly enter a real-time bot prevention code, a knockout message 500 can be displayed as depicted in FIG. 5. Similarly, if there is an eligibility issue, a knockout message 550 can be displayed as depicted in the example of FIG. 6.

The knockout message 550 is an example of a result of an eligibility violation and may include a general notice of ineligibility 552 and a detailed explanation 554. The example of FIG. 6 illustrates information that can be conveyed upon determining that a time-based household redemption rule violation has been detected. For instance, a time-based household redemption rule can be applied to check whether any other offers have been redeemed by a household corresponding to address information gathered in data collection portion 404 of FIG. 4 within an eligibility period (e.g., within the last 120 days). Similar knockout messages with different values of the detailed explanation 554 can be output based on detecting other eligibility issues, such as an ineligible geographic location, current customer status, driver's license status, age, and the like. Filtering out ineligible users early in the process can reduce processing system loads and potential network traffic volume associated with more detailed data collection and third-party user verification.

Figure 8:
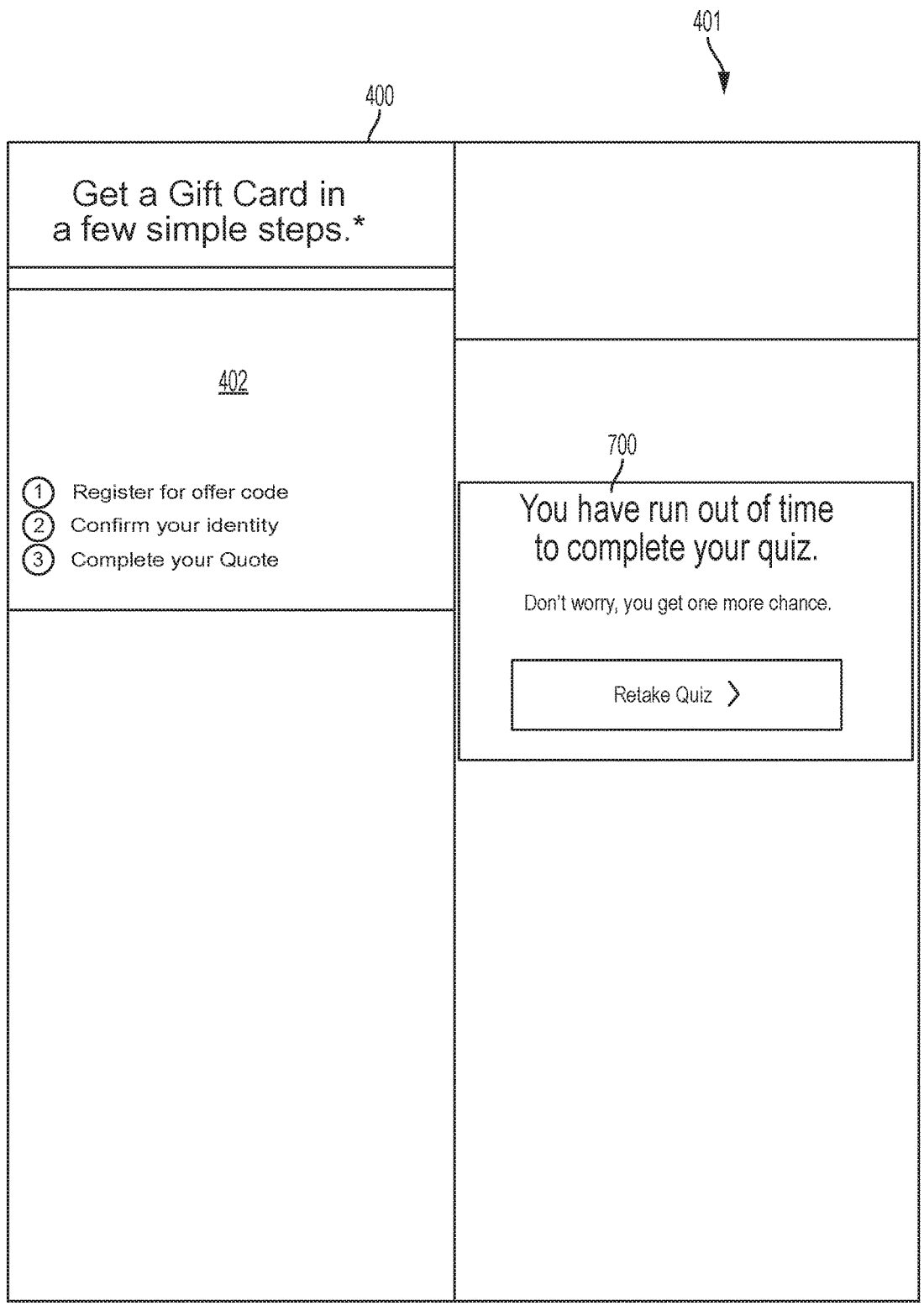
FIG. 8 depicts a knockout message due to a timeout at a user input interface according to some embodiments of the present invention.

Upon passing initial eligibility and bot prevention challenges, an identity control 600 of FIG. 7 can be used to confirm entry of at least one identifying characteristic that matches the targeted user 132 of FIG. 1. Profile information collected in the data collection portion 404 of FIG. 4 can be used by a personal identity verification service to lookup additional identifying characteristics for use in an identity quiz. The substance of quiz material in the identity control 600 may be provided by one of the third-party support systems 110 of FIG. 1, such that personal identifying information used in the quiz need not be known or retained within the one or more databases 124 of FIG. 1. The identity control 600 can also include a timeout feature to reduce the chances that a fraudulent user will be able to look up the answers and respond before the timeout expires. An example of a knockout message 700 due to a timeout of the quiz at user input interface 401 is depicted in FIG. 8. If the identity control 600 of FIG. 7 cannot verify the data entered, the knockout message 500 of FIG. 5 or a similar message can be displayed prior to terminating the data entry session or allowing another attempt.

Figure 9:
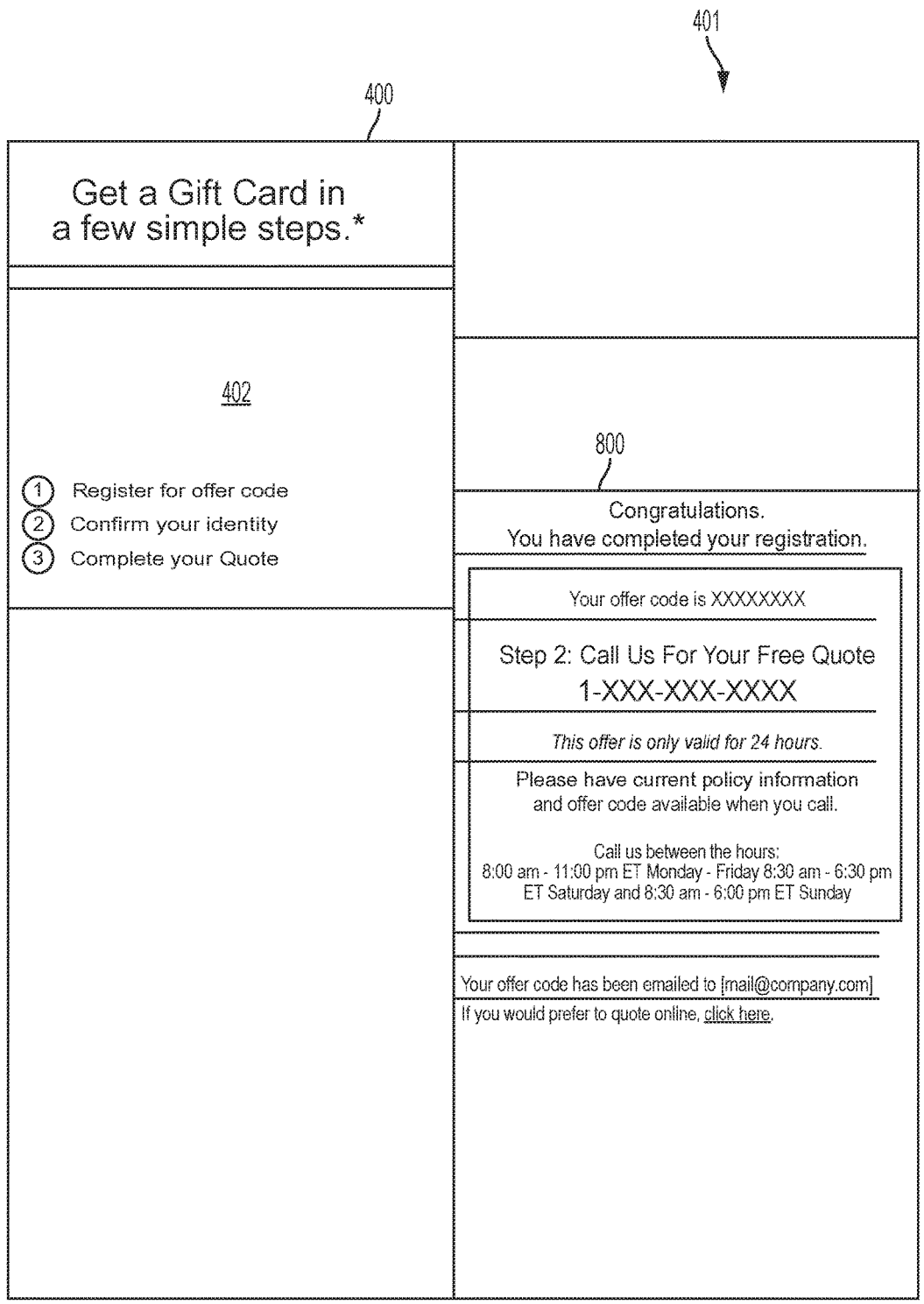
FIG. 9 depicts registration completion with telephone follow up at a user input interface according to some embodiments of the present invention.
Figure 10:
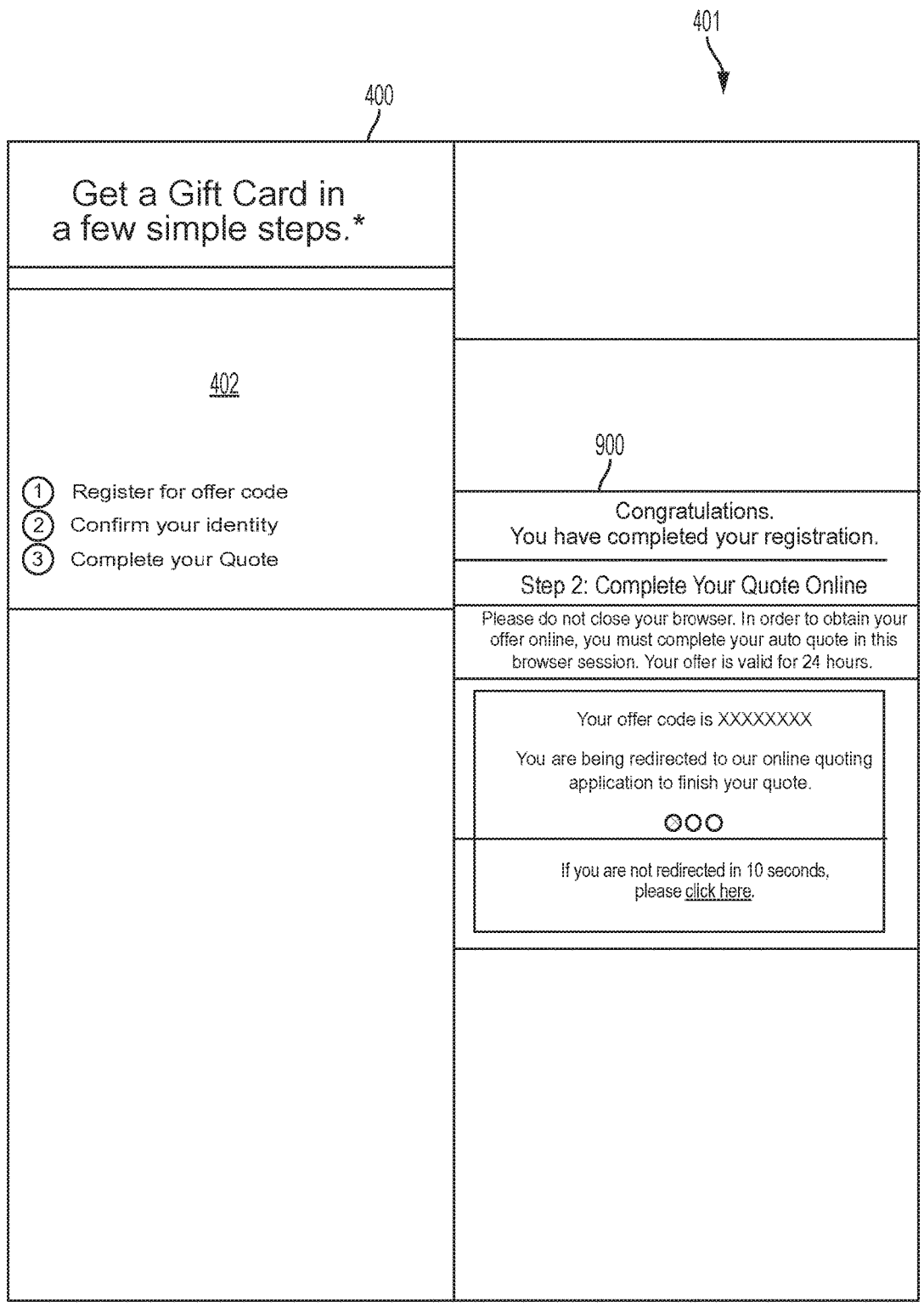
FIG. 10 depicts registration completion with web-based follow up at a user input interface according to some embodiments of the present invention.

Upon passing the quiz, the targeted user 132 of FIG. 1 may be provided with one of two options, according to an embodiment. If a preferred path is identified for the targeted user 132 of FIG. 1 after completion of the registration form 400, the targeted user 132 of FIG. 1 may be notified to contact a call center as depicted in notification 800 of FIG. 9. Alternatively, the targeted user 132 of FIG. 1 may be notified via notification 900 of FIG. 10 and passed to an online quoting application (not depicted) to complete a quote and redeem an incentive. If sent through the online quoting application, the registration data of the targeted user 132 of FIG. 1 can be prefilled into the quoting application for ease of quote completion. Once the targeted user 132 of FIG. 1 has reached quote completion in the quoting application, a message may appear confirming the delivery of the incentive offer. Concurrently, the offer can be fulfilled using the system 100 of FIG. 1 to either activate the incentive offer, such as an eCard or eGift, for example, or fulfill the incentive offer via mail.

If the targeted user 132 of FIG. 1 is sent to a call center to complete a quote, the registration information of the targeted user 132 of FIG. 1 can be automatically pre-filled into the call center representative's toolset. Additionally, features are available for the call center representative to view the offer history and eligibility, and, upon completion of a quote, to activate or fulfill the incentive via a single button press through internal web application 138 of FIG. 1.

Figure 11:
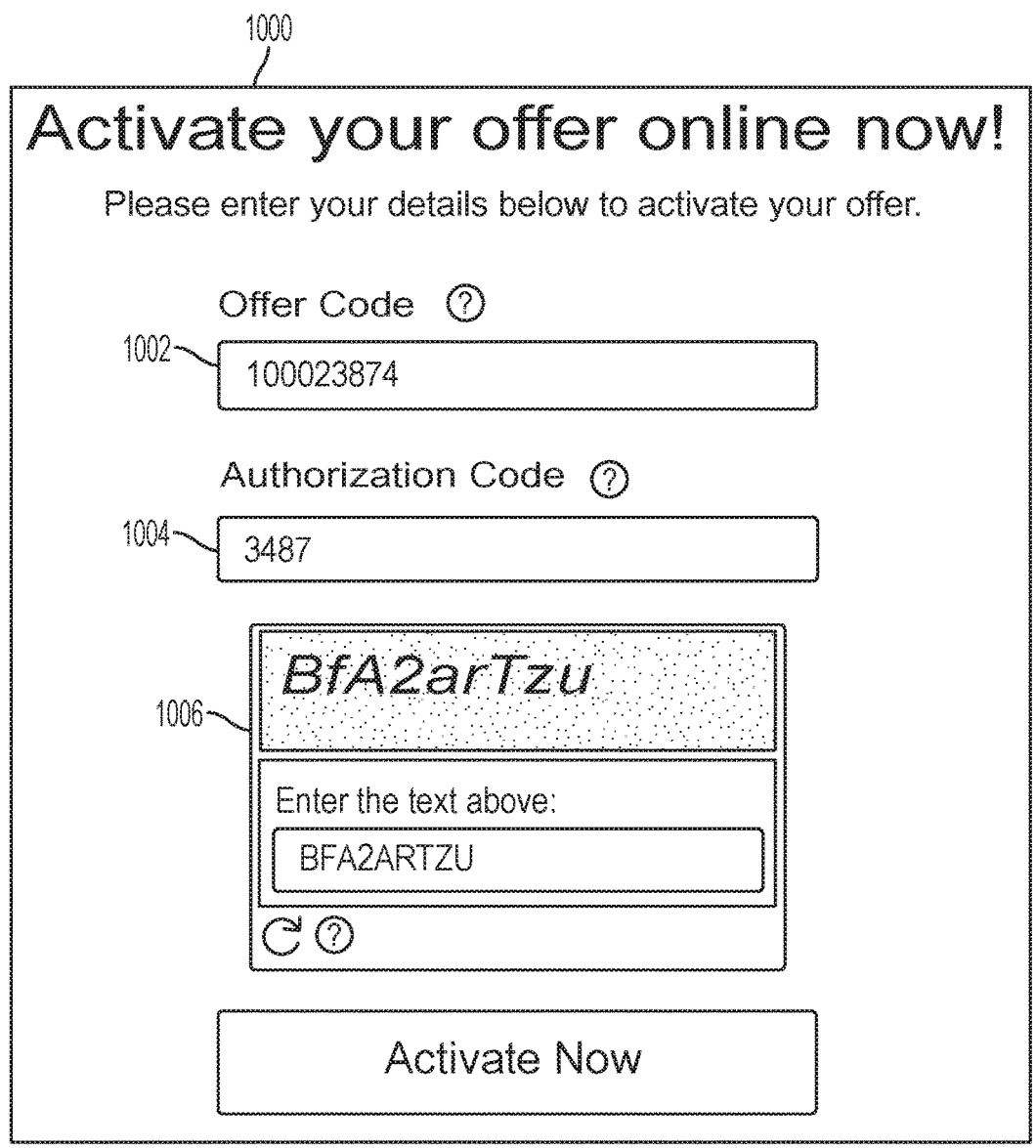
FIG. 11 depicts offer activation at a user input interface according to some embodiments of the present invention.

In some instances, the targeted user 132 of FIG. 1 may receive the incentive as a physical card mailed inactive, as well as an email containing a unique code. The direct mail piece may contain the incentive card and a different unique code. Upon receipt of the mail piece, the targeted user 132 of FIG. 1 has an opportunity to activate the card using an online activation portal 1000, as depicted in FIG. 11, in which both unique codes are entered to activate the card. For example, the physical mail with the card may include an offer code 1002, and the email may include an authorization code 1004. Similar to the registration form 400 of FIG. 4, the online activation portal 1000 may include a bot prevention interface 1006. The online activation portal 1000 may comprise part of the external web application 140 of FIG. 1.

Figure 12:
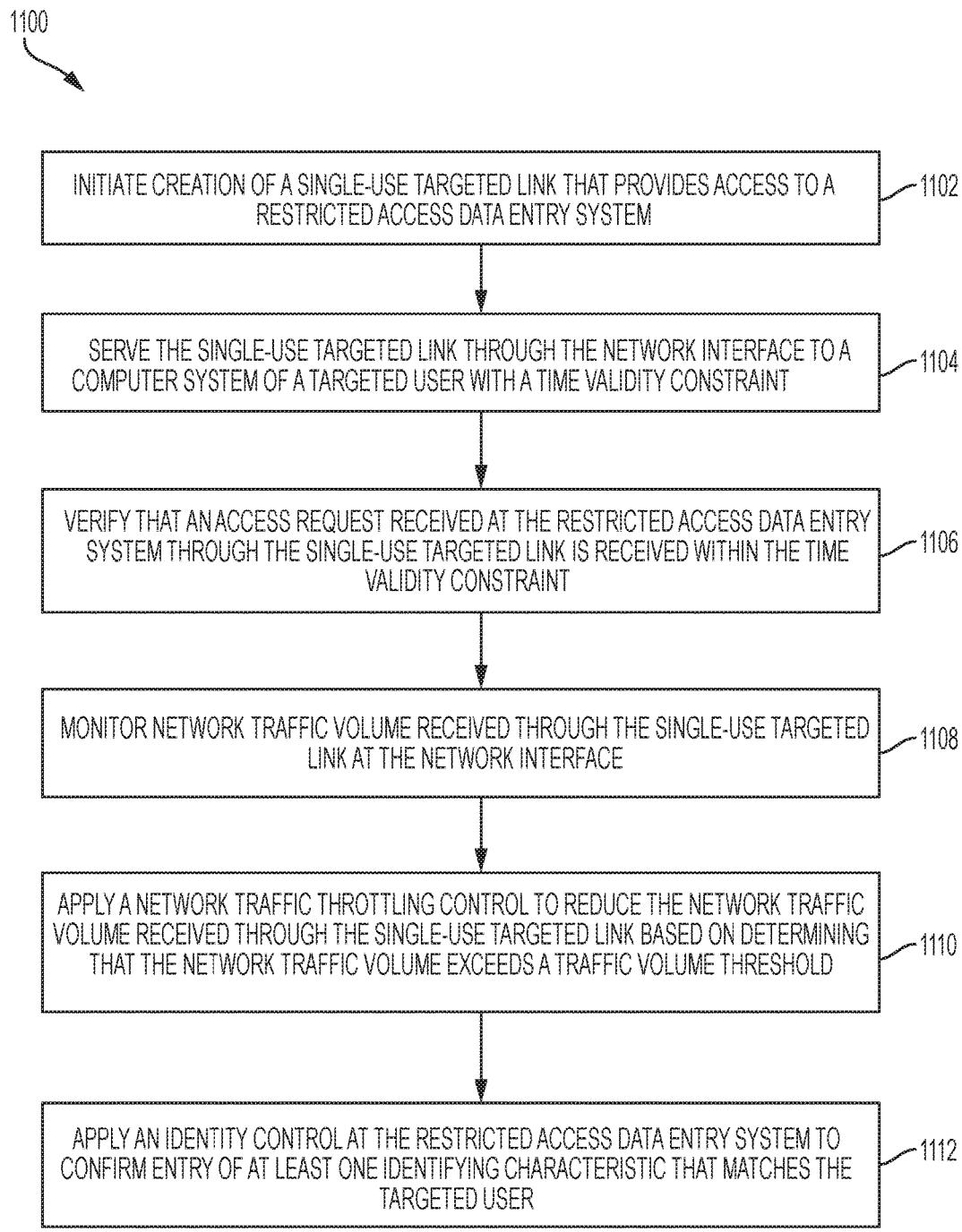
FIG. 12 depicts a process flow according to some embodiments of the present invention.

Turning now to FIG. 12, a process flow 1100 is depicted according to an embodiment. The process flow 1100 includes a number of steps that may be performed in the depicted sequence or in an alternate sequence. The process flow 1100 may be performed by the system 100 of FIG. 1. In one embodiment, the process flow 1100 is performed by the external web servers 102 of FIG. 1 in combination with the internal web/application servers 116.

At step 1102, creation of a single-use targeted link, such as the single-use URL 316 of FIG. 3, which provides access to restricted access data entry system 117 of FIG. 1, is initiated. For instance, providing web ad vendor 300 of FIG. 3 with code 314 in web ad setup 302 initiates creation of a single-use targeted link, and creation of the single-use URL 316 is finalized when the code 314 is executed upon serving the web ad 304. Alternatively, initiation of the creation of a single-use targeted link can be performed for platforms that do not support code execution by using, for instance, email address based searching and an intermediate landing page to retrieve an identifier, generate a key, and determine validity. Each of the instances of the single-use targeted link may be associated with an incentive to encourage data entry by one or more targeted users, such as targeted user 132 of FIG. 1. The single-use targeted link may include a base URL, a generated user identifier, a timestamp, a checksum, and an incentive identifier appended together and hashed.

At step 1104, the single-use targeted link is served through a network interface to a computer system of a targeted user with a time validity constraint, such as one of the user systems 106 of FIG. 1. At step 1106, an access request received at the restricted access data entry system 117 is verified through the single-use targeted link as received within the time validity constraint. By including a timestamp within metadata of the single-use targeted link, the system 100 of FIG. 1 can determine how much time has elapsed since the single-use targeted link was created. Access to the incentive may be locked on a targeted user basis based on determining that the access request received at the restricted access data entry system 117 through the single-use targeted link is not received within the time validity constraint. For instance if more than twenty-four hours have elapsed, the incentive may be deemed expired.

At step 1108, network traffic volume received through the single-use targeted link at the network interface is monitored. At step 1110, a network traffic throttling control is applied to reduce the network traffic volume received through the single-use targeted link based on determining that the network traffic volume exceeds a traffic volume threshold. The network traffic throttling control can be implemented by the service API 134 of FIG. 1. In one embodiment, a coherency cache may track a plurality of access requests associated with multiple instances of the single-use targeted link with respect to time, as further described with respect to FIGS. 13A and 13B. Access to the incentive may be locked based on determining that the network traffic volume exceeds a traffic volume threshold. A state of a kill switch can also be monitored, where access to the incentive is locked based on determining that the kill switch is asserted. A kill switch can be automated to shut down a particular incentive, multiple incentives, or an entire web site based on threshold conditions. Distribution of incentives can also be monitored by a user through the internal web application 138 of FIG. 1 and manually disabled (i.e., a manual kill switch).

IP addresses of computer systems, such as one or more of the user systems 106 of FIG. 1, attempting to access the restricted access data entry system 117 can also be monitored. The IP addresses can be compared to values on an IP blacklist that indicates previously identified suspect devices. Attempted access to the restricted access data entry system 117 is blocked based on determining that an IP address of the computer system attempting to access the restricted access data entry system 117 is included on the IP blacklist. A risk advisor service of the third-party support systems 110 of FIG. 1 may also be used to detect attempted fraud associated with personal identity information rather than IP addresses.

At step 1112, an identity control, such as identity control 600 of FIG. 7, is applied at the restricted access data entry system 117 to confirm entry of at least one identifying characteristic that matches the targeted user 132 of FIG. 1.

The external web application 140 can provide a data collection interface to collect the at least one identifying characteristic and pass the access request to the service API 134 of the restricted access data entry system 117 to initiate verifying that the access request was received within the time validity constraint. Access to the incentive can be further based on receiving a real-time bot prevention code prior to exceeding an attempt threshold, for instance, using bot prevention interface 406 of FIG. 4. Access to the incentive can also be constrained based on various eligibility checks as previously described. For example, time-based household redemption rules can ensure that another user having a same mailing address has not previously redeemed an incentive offer within an eligibility period (e.g., within the last four months).

An activation code for the incentive may be provided based on confirming entry of at least one identifying characteristic that matches the targeted user. The incentive can be activated based on subsequently receiving the activation code in combination with a real-time bot prevention code. The activation code may be formed as a combination of an offer code 1002 and authorization code 1004 as depicted in the example of FIG. 11.

Figure 13A:
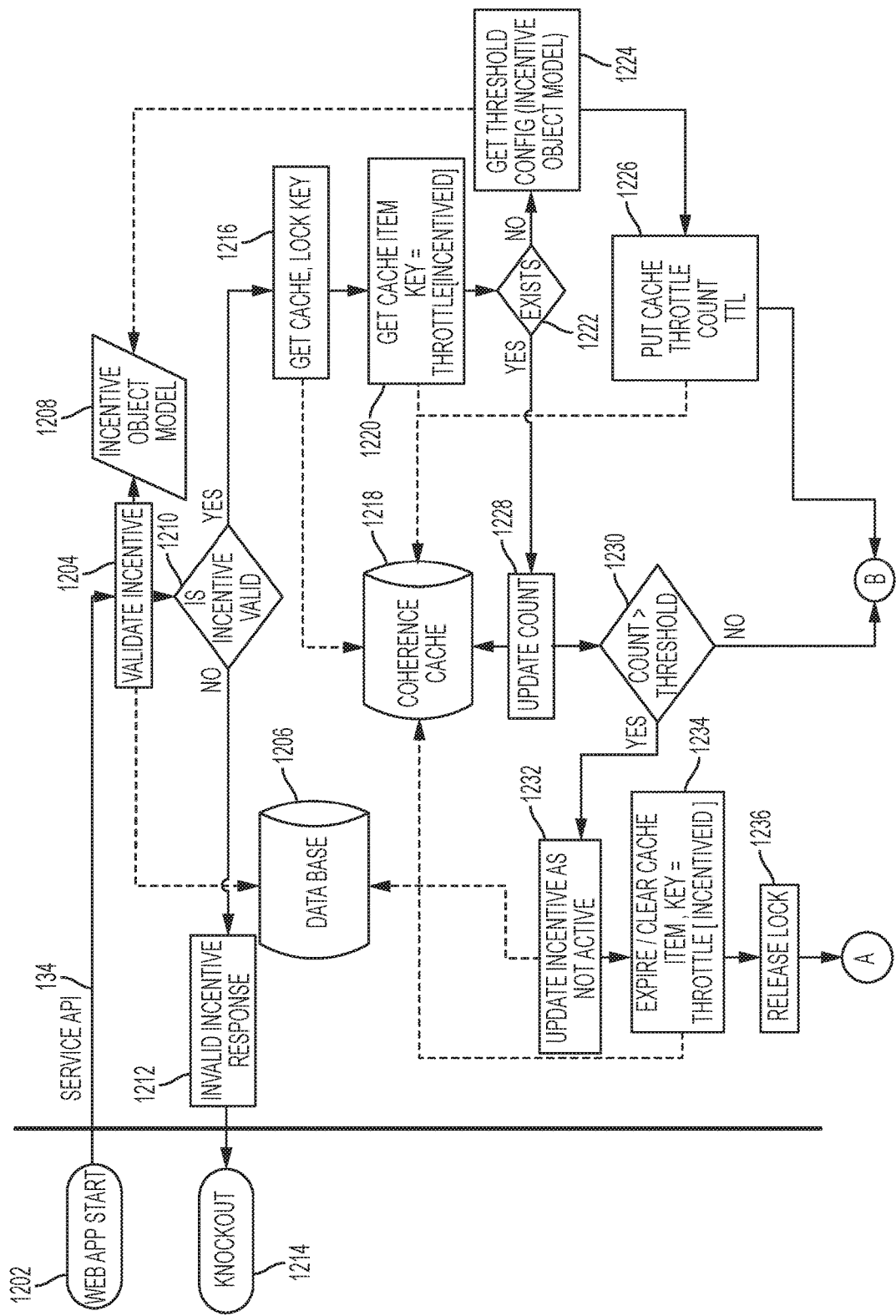
FIGS. 13A and 13B depict a process flow according to some embodiments of the present invention.
Figure 13B:
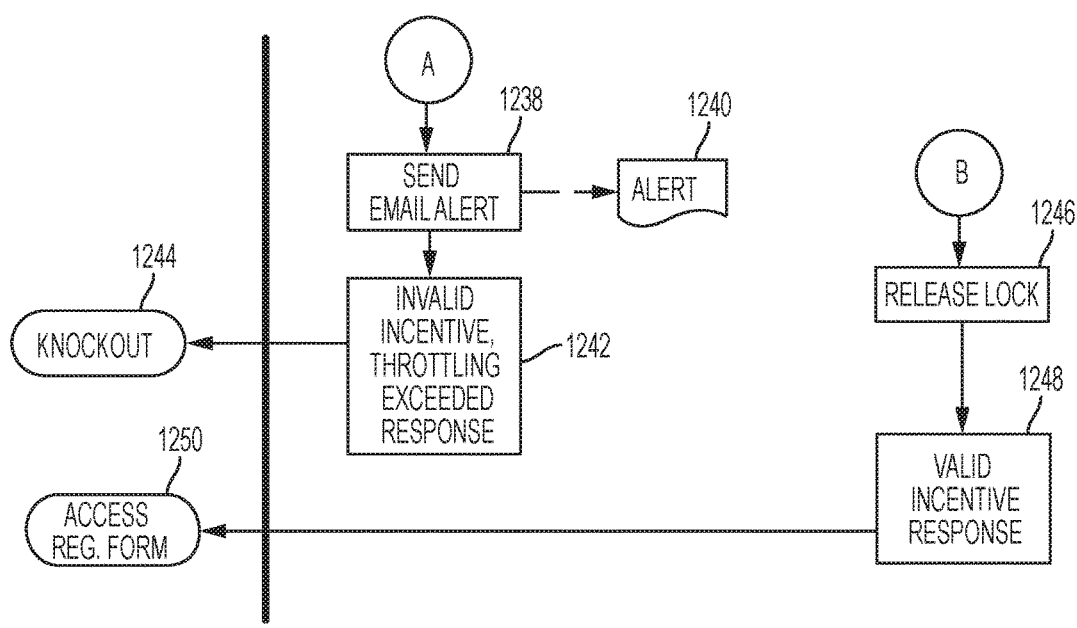

FIGS. 13A and 13B depict a process flow 1200 according to an embodiment. The process flow 1200 illustrates various steps that can be performed to prevent network traffic spikes. Each offer or incentive can be configured to accept up to x hits per hour (e.g., a traffic volume threshold) to align with a number of ads pushed per hour by the web ad vendor 300 of FIG. 3. If the number of hits exceeds the traffic volume threshold, the incentive has been compromised and unwanted traffic is being received which results in a network traffic spike. In response to detecting that the network traffic volume has exceeded the traffic volume threshold, the incentive is locked. As a further alternative, a kill switch may be triggered through the internal web application 138 of FIG. 1 at any point that a problem with an incentive is detected or system integrity is suspect.

At block 1202, a web application start signal may be received at the service API 134 from the external web application 140 of FIG. 1 to validate an incentive at block 1204. The processing performed by the service API 134 can be implemented as back-end processing without a direct user interface. An incentive validation event may be recorded in a database 1206, which may comprise part of the one or more databases 124 of FIG. 1. An incentive object model 1208 may be instantiated with information about an incentive. At block 1210, an incentive validity check is performed. If the incentive is invalid, an invalid incentive response 1212 is generated, which results in a knockout message 1214. If the incentive is valid, then a key from a coherence cache 1218 is locked at block 1216. A throttle value associated with an incentive identifier key is retrieved from the coherence cache 1218 at block 1220. If the throttle identifier is not found in the coherence cache 1218 at block 1222, then a threshold configuration is retrieved from the incentive object model 1208 at block 1224, and the coherence cache 1218 is updated at block 1226 with a throttle identifier, count, and duration (time-to-live).

If the throttle identifier is found in the coherence cache 1218 at block 1222, then a count is updated in the coherence cache 1218 at block 1228 and comparison of the count to a threshold is performed at block 1230. If the count exceeds the threshold (e.g., the traffic volume threshold) at block 1230, the incentive is updated as inactive at block 1232, the associated entry in the coherency cache 1218 is cleared at block 1234, and the lock is released at block 1236. At block 1238, an email alert is sent, for instance as an alert 1240 to one of the internal user systems 120 of FIG. 1. The incentive is declared invalid due to throttling exceeding the response at block 1242, and a knockout message 1244 can be displayed. If the count does not exceed the threshold (e.g., the traffic volume threshold) at block 1230 or if block 1226 is performed, then the lock is released at block 1246, there is a valid incentive response 1248, and access to registration form 400 of FIG. 4 is granted at block 1250. Thus, the process 1200 enables monitoring and throttling of offers/incentives on a per incentive basis, such that compromised incentives and the associated network traffic is stopped while still allowing other incentives to remain active if they remain within the expected network traffic limits.

Technical effects include the use of single-use URLs for digitally generated offers to filter out further attempts to access a restricted access data entry system beyond an initial access. Further technical effects include throttling of access attempts to the restricted access data entry system from external sources to eliminate or reduce unwanted or fraudulent traffic potential. Additional technical effects include access restrictions to prevent offer creation by bots and to verify/validate user identity. User eligibility checks and the ability to route users through different interactive follow up options can further reduce network and computer system loading. The ability to manage and distribute offers for multiple media channels using one centralized platform further enhances efficiency.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/ or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
    a network interface operable to interact with a plurality of computer systems through one or more network connections;
    at least one processing device; and
    at least one memory device in communication with the at least one processing device, the at least one memory device storing instructions that when executed by the at least one processing device result in:
    initiating creation of a single-use targeted link that provides access to a restricted access data entry system, wherein the single-use targeted link comprises an encoded combination of a generated user identifier, a time-based indicator, and an incentive identifier;
    serving the single-use targeted link through the network interface to a computer system of a targeted user with a time validity constraint;
    verifying that an access request received at the restricted access data entry system through the single-use targeted link is received within the time validity constraint;
    monitoring network traffic volume received through the single-use targeted link at the network interface;
    applying a network traffic throttling control to reduce the network traffic volume received through the single-use targeted link based on determining that the network traffic volume exceeds a traffic volume threshold; and
    applying an identity control at the restricted access data entry system to confirm entry of at least one identifying characteristic that matches the targeted user.

2. The system of claim 1, wherein an external web application provides a data collection interface to collect the at least one identifying characteristic and passes the access request to a service application programming interface of the restricted access data entry system to initiate verifying that the access request was received within the time validity constraint.

3. The system of claim 2, further comprising a coherency cache that tracks a plurality of access requests associated with multiple instances of the single-use targeted link with respect to time.

4. The system of claim 3, wherein each of the instances of the single-use targeted link is associated with an incentive to encourage data entry by one or more targeted users.

5. The system of claim 4, wherein access to the incentive is locked based on determining that the network traffic volume exceeds a traffic volume threshold.

6. The system of claim 4, further comprising instructions that when executed by the processing device result in:
monitoring a state of a kill switch; and
locking access to the incentive based on determining that the kill switch is asserted.

7. The system of claim 4, further comprising instructions that when executed by the processing device result in:
locking access to the incentive on a targeted user basis based on determining that the access request received at the restricted access data entry system through the single-use targeted link is not received within the time validity constraint.

8. The system of claim 4, further comprising instructions that when executed by the processing device result in:
providing an activation code for the incentive based on confirming entry of at least one identifying characteristic that matches the targeted user; and
activating the incentive based on subsequently receiving the activation code in combination with a real-time bot prevention code.

9. The system of claim 4, wherein access to the incentive is further based on receiving a real-time bot prevention code prior to exceeding an attempt threshold.

10. The system of claim 1, further comprising instructions that when executed by the processing device result in:
monitoring Internet Protocol (IP) addresses of computer systems attempting to access the restricted access data entry system;
comparing the IP addresses to values on an IP blacklist that indicates previously identified suspect devices; and
blocking attempted access to the restricted access data entry system based on determining that an IP address of the computer system attempting to access the restricted access data entry system is included on the IP blacklist.

11. A computer program product comprising a non-transitory computer-readable storage medium embodied with computer program instructions that when executed by a computer cause the computer to implement:
initiating creation of a single-use targeted link that provides access to a restricted access data entry system, wherein the single-use targeted link comprises an encoded combination of a generated user identifier, a time-based indicator, and an incentive identifier;
serving the single-use targeted link through the network interface to a computer system of a targeted user with a time validity constraint;
verifying that an access request received at the restricted access data entry system through the single-use targeted link is received within the time validity constraint;
monitoring network traffic volume received through the single-use targeted link at the network interface;
applying a network traffic throttling control to reduce the network traffic volume received through the single-use targeted link based on determining that the network traffic volume exceeds a traffic volume threshold; and applying an identity control at the restricted access data entry system to confirm entry of at least one identifying characteristic that matches the targeted user.

12. The computer program product of claim 11, further comprising computer program instructions that when executed by the computer cause the computer to implement:
a coherency cache that tracks a plurality of access requests associated with multiple instances of the single-use targeted link with respect to time.

13. The computer program product of claim 12, wherein each of the instances of the single-use targeted link is associated with an incentive to encourage data entry by one or more targeted users.

14. The computer program product of claim 13, wherein access to the incentive is locked based on determining that the network traffic volume exceeds a traffic volume threshold.

15. The computer program product of claim 13, further comprising computer program instructions that when executed by the computer cause the computer to implement:
monitoring a state of a kill switch; and
locking access to the incentive based on determining that the kill switch is asserted.

16. The computer program product of claim 13, further comprising computer program instructions that when executed by the computer cause the computer to implement:
locking access to the incentive on a targeted user basis based on determining that the access request received at the restricted access data entry system through the single-use targeted link is not received within the time validity constraint.

17. The computer program product of claim 13, further comprising computer program instructions that when executed by the computer cause the computer to implement:
providing an activation code for the incentive based on confirming entry of at least one identifying characteristic that matches the targeted user; and
activating the incentive based on subsequently receiving the activation code in combination with a real-time bot prevention code.

18. The computer program product of claim 13, wherein access to the incentive is further based on receiving a real-time bot prevention code prior to exceeding an attempt threshold.

19. The computer program product of claim 11, further comprising computer program instructions that when executed by the computer cause the computer to implement:
monitoring Internet Protocol (IP) addresses of computer systems attempting to access the restricted access data entry system;
comparing the IP addresses to values on an IP blacklist that indicates previously identified suspect devices; and
blocking attempted access to the restricted access data entry system based on determining that an IP address of the computer system attempting to access the restricted access data entry system is included on the IP blacklist.

* * * * *